US008491027B2

(12) United States Patent
Izzo

(10) Patent No.: US 8,491,027 B2
(45) Date of Patent: Jul. 23, 2013

(54) RELEASABLE HANDLE FOR USE WITH TARPAULINS AND OTHER FLEXIBLE SHEET MATERIALS

(76) Inventor: Ronald M. Izzo, Cranston, RI (US)

(*) Notice: Subject to any disclaimer, the term of this patent is extended or adjusted under 35 U.S.C. 154(b) by 120 days.

(21) Appl. No.: 13/099,773

(22) Filed: May 3, 2011

(65) Prior Publication Data

US 2012/0280524 A1 Nov. 8, 2012

(51) Int. Cl.
*A45F 5/00* (2006.01)
(52) U.S. Cl.
USPC ............. 294/158; 294/141; 294/165; 24/519
(58) Field of Classification Search
USPC ............... 294/137, 141, 142, 158, 165, 166, 294/104; 24/532, 535, 508, 519, 520, 645, 24/647
See application file for complete search history.

(56) References Cited

U.S. PATENT DOCUMENTS

| 678,654 | A | * | 7/1901 | Gaillard | 24/520 |
|---|---|---|---|---|---|
| 881,372 | A | * | 3/1908 | Buchanan | 24/516 |
| 1,512,539 | A | * | 10/1924 | Holton | 24/507 |
| 4,112,541 | A | * | 9/1978 | Tetradis | 294/165 |
| 4,580,372 | A | * | 4/1986 | Osborn | 52/3 |
| 4,901,408 | A | * | 2/1990 | Hermann | 24/637 |
| 5,388,313 | A | | 2/1995 | Cameron | |
| 6,698,071 | B1 | | 3/2004 | Greer, Jr. | |
| 6,957,914 | B2 | * | 10/2005 | Arends et al. | 383/37 |
| 7,185,402 | B2 | * | 3/2007 | Beltz | 24/519 |
| 7,189,024 | B2 | | 3/2007 | Cameron | |
| 7,243,402 | B2 | | 7/2007 | Andersen | |
| 2002/0000027 | A1 | | 1/2002 | Andersen | |
| 2003/0115726 | A1 | | 6/2003 | Liao | |
| 2009/0314321 | A1 | | 12/2009 | Van Dyken | |

OTHER PUBLICATIONS

Author Unknown, PEKO Products web advertisement, www.pekoproducts.com/tarp.htm.

* cited by examiner

*Primary Examiner* — Dean Kramer
(74) *Attorney, Agent, or Firm* — Chace Ruttenberg & Freedman, LLP; LuAnn Cserr

(57) ABSTRACT

The invention provides a removable device for securing and handling tarpaulins and other flexible sheet materials. The device can be attached to the tarpaulin anywhere along its edge but it is most conveniently employed at one or more available grommets. The device includes a base member a closure member and a hinge positioned there between to move the closure member from open to closed positions to secure the device to the tarpaulin. The base member includes a integral handle region for ease of carrying and securing the contents of the tarpaulin.

10 Claims, 7 Drawing Sheets

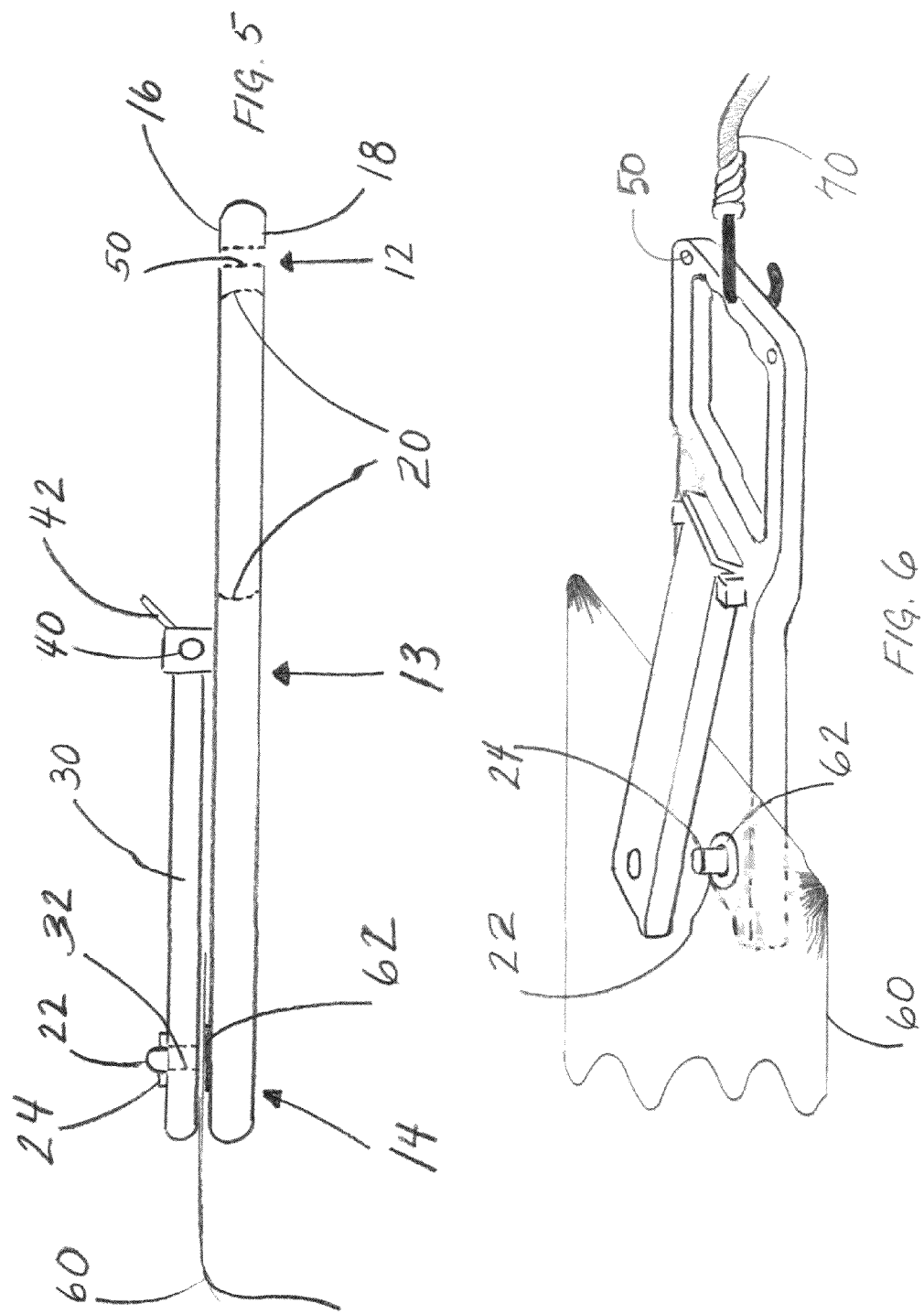

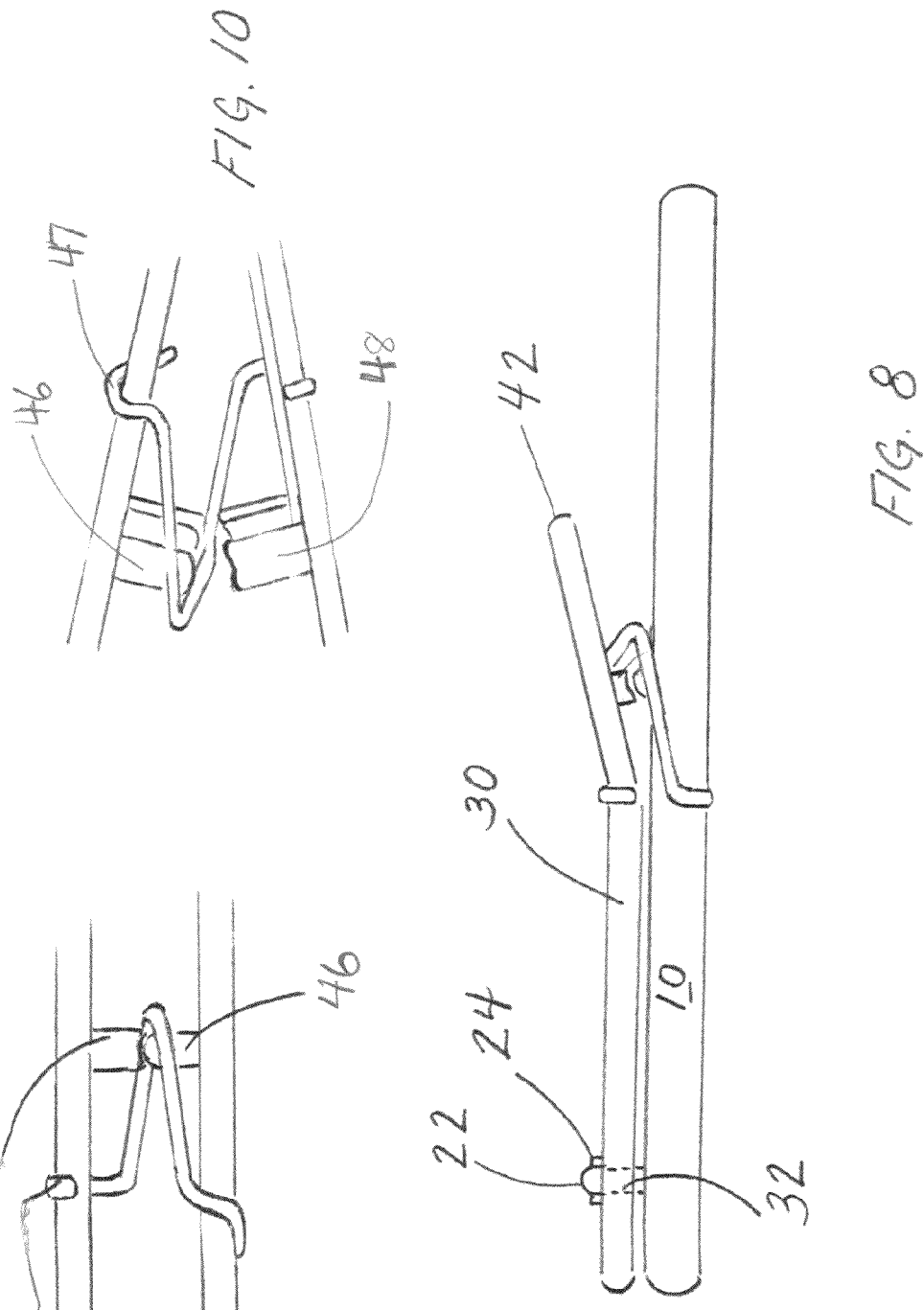

RELEASABLE HANDLE FOR USE WITH TARPAULINS AND OTHER FLEXIBLE SHEET MATERIALS

FIELD OF THE INVENTION

The invention is in the field of handles and fasteners for flexible sheet materials, and in particular handles and fasteners for tarpaulins having grommets.

BACKGROUND OF THE INVENTION

There exist a variety of flexible sheet materials that are used for temporarily covering objects, for example roofs of leaky structures until repairs can be made, sand-boxes, patio furniture during the winter, swimming pools, lumber, firewood stacks, or articles during road transport. These flexible sheet materials will be referred to herein as tarpaulins (although as originally defined tarpaulin referred to a heavy-duty waterproof cloth of tarred canvas, which was first used in the 1600s). Tarpaulins are also used to collect objects and articles to make clean-up faster. For example, landscapers use tarps to collect leaves, dirt, clippings, and weeds in order to haul the collection away for disposal. Tarpaulins find use in covering delicate outdoor plants during the winter in some climates. Roofers use tarpaulins to collect roofing debris when replacing roof shingles. Dumping vehicles use tarpaulins to cover their load while in transport to prevent debris from falling out of the vehicle. Mesh tarpaulins are employed to create privacy screens. Campers use tarpaulins to create make-shift, temporary shelters. Sports fans sometimes use tarpaulins to create tail-gate party shelters and to cover themselves against rain or snow in outdoor stadiums. In emergencies, tarpaulins find a massive variety of creative uses.

Tarpaulins can be made of any type of flexible sheet material. Exemplary are polyethylene, vinyl, canvas, coated-canvas, plastic, vinyl-coated polyester, latex, nylon-coated polyethylene, polyethylene filament coated with polyethylene, vinyl-laminated nylon, single filament nylon between layers of polyethylene, knitted mesh, polyvinyl chloride-coated mesh, and bi-layers materials such as cloth and vinyl. Tarpaulins can be grommeted or not when manufactured, and when not grommeted when manufactured, grommets can be added later.

A variety of attachment or fastening devices, typically of the clip-type, are known for use as securing mechanisms for tarpaulins. One category of such devices includes fasteners of the alligator-clip type which use various external means of adjusting and closing the alligator-clip portion of the device, such as lock nuts, collars and pivot connections. Lock nuts are disclosed in U.S. Patent Publication Nos. 2003/0115726 (Liao) and 2002/0000027 (Andersen et al.), collars are disclosed in U.S. Pat. Nos. 6,698,071 (Greer, Jr. et al.) and 5,388,313 (Cameron), and a pivot connection is disclosed in U.S. Pat. No. 7,243,402 (Anderson et al.). This type of clip is used on the material portion of the tarpaulin, not in the grommet, and for that reason they tend to cause excessive wear on the material and can even tear through the material with repeated use in the same location or when the tarpaulin is subjected to excessive strain or force. Another category of known tarpaulin securing devices is composed of U.S. Pat. Nos. 7,189,024 (Cameron) and 6,718,600 (Gillis), which disclose more or less flat mating connector members that twist into place with the material portion of the tarpaulin in between. A third category, composed of U.S. Pat. Nos. 7,406,753 (LaScala); 5,074,014 (Freeman); and 4,688,304 (Marcott), discloses fasteners of the button-retainer or wedge-retainer type in which the tarpaulin material is held in place once the button or wedge is slid into place in the retainer.

It would be advantageous to provide a tarpaulin securing device that is intended to make use of the grommets provided with or added to the tarpaulin material in order to lessen the likelihood of tearing the tarpaulin material. It would also be advantageous to provide a tarpaulin securing device that provides a means of handling the tarpaulin using the securing device. None of the foregoing documents disclose handles that are integral to a tarpaulin securing device. One document, U.S. Patent Publication No. 2009/0314321 (Van Dyken) discloses both tarp fasteners and handles, but they are separate from each other on the tarpaulin and the handles are not removable. Surprisingly, although tarpaulins have been around for hundreds of years, materials for making fastening devices have been around for hundreds of years (at least metals have; plastics have come along later), and handles for objects have been around for hundreds of years, it appears that tarpaulin fastening devices having integral handles are not known. This apparent lack in the art is remedied by the invention described here.

SUMMARY OF THE INVENTION

The invention provides a removable device for securing and handling tarpaulins and other flexible sheet materials. (For convenience, hereinafter all of these materials will be term "tarpaulins".) The device can be attached to the tarpaulin anywhere along its edge but it is most conveniently employed at one or more available grommets, which are typically integrally arranged in the corners and around the circumference of the tarpaulin. The device is composed of a substantially planer base member that has a handle portion formed in one end of the base member and a post portion formed in the end opposite. The base member can be any shape but will commonly be rectangular, oblong, elliptical or paddle-shaped. Being substantially planer, the base member has a top surface and a bottom surface and a first opening, or cut out, in the handle portion end extending from the top surface through the bottom surface that is formed to enable the hand of the user of the device to grasp and hold the device, as an integral handle. The opening can be of any size or shape as long as the hand of the user will be able to extend through it to grasp the device. On the top surface at the opposite, post portion end, the base member has a rigid post fastened at its lower end to the top surface of the base member and in perpendicular relation to the top surface of the base member. The rigid post may be formed as an integral part of the base member. The shape of the post is not critical; it can be square, rectangular, triangular or cylindrical for example. The post has a boss at or near its upper end, which is formed to releasably hold the closure member of the device in place as will be explained in detail below. The boss can be any type of protrusion on the surface of the post, as long as it will catch or clasp and hold the closure member in place while the device is in use and permit the user to release the closure member from the base member when the user so desires. A preferred boss is an annular ring integrally formed in the post. The base member has two functions: it acts as an integral handle for the device and it provides a base onto which a closure member may be engaged to secure the device in place on the tarpaulin.

The closure member may be a substantially planer structure, significantly smaller in size than the base member but of the same basic shape. Conveniently perhaps, the closure member can be shaped for example as a base member bisected along its width to form a structure approximately one half the size of the base member. However, the actual shape of the closure member is not critical as long as it is small enough so that it does not cover any portion of the first opening (or integral handle) in the base member and is large enough to extend over the base member's post. One end or edge, the closure member is hingably mounted onto the base member in a substantially central location between the integral handle and the base member post. At the opposite end near the edge, the closure member has a hole formed and positioned for mating engagement with the base member post, to allow insertion of the base member post through the hole to snap-close the closure member in superposed relation to the base member.

The device also includes a hinge mounted between the base member and the one end or edge of the closure member for moving the closure member between an open position substantially perpendicular to the base member and a closed—locked position substantially superposed on the base member. Preferred hinge types include spring-loaded, pin, butt and mouse trap hinges. Alternatively, the hinge may be formed and positioned in the closure member inward from the edge, forming a lip that the user can press to release the closure member in its closed-locked position.

Optionally, the device as described above may include, in the base member, a second opening or openings in area of the base member forming the integral handle formed and positioned to permit the removable attachment of another object or objects to the device. These openings can be holes or small bores extending from the top surface through the bottom surface of the base member. This size of the openings or holes must be large enough to permit attachment of, for example, a lanyard, bungee cord, clip, or string, but small enough so that the structural integrity and strength of the handle portion of the base member is maintained.

The base member, post, and closure member may be composed of a wide variety of materials. Exemplary are polymers, thermoset polymers, aluminum and aluminum blends, wood, steel, stainless steel, copper and copper blends, and lead-coated copper and copper blends. Molded resilient materials are preferred and particularly injection molded plastics and thermoset polymers. Exemplary types of polymers include polystyrenes, polyvinyl chlorides, polyesters, polyethylene terephthalates, low-density polyethylenes, polypropylenes, apolyamides, acrylonitrile butadiene styrenes, polycarbonates, polycarbonate/acrylonitrite butadiene styrene blends, polyurethanes, melamine formaldehydes, plastics, and elastomeric plastics. Preferred materials include glass fiber reinforced molded nylon and polypropylene. The same material need not be used for all parts of the device.

A rubber coating may be applied to all or some of the parts of the releasable handle device of the invention to provide a scratch-resistant, non-slip covering.

BRIEF DESCRIPTION OF THE DRAWINGS

FIG. 5 illustrates the device with a tarp being held in place on the post.

FIG. 6 illustrates the device in the partially open position with tarp in place and an optional bungee cord through one of the holes positioned in the handle portion of the base member.

FIGS. 8-10 illustrate an alternative embodiment of the hinge portion of the device.

DETAILED DESCRIPTION

Figure 1:
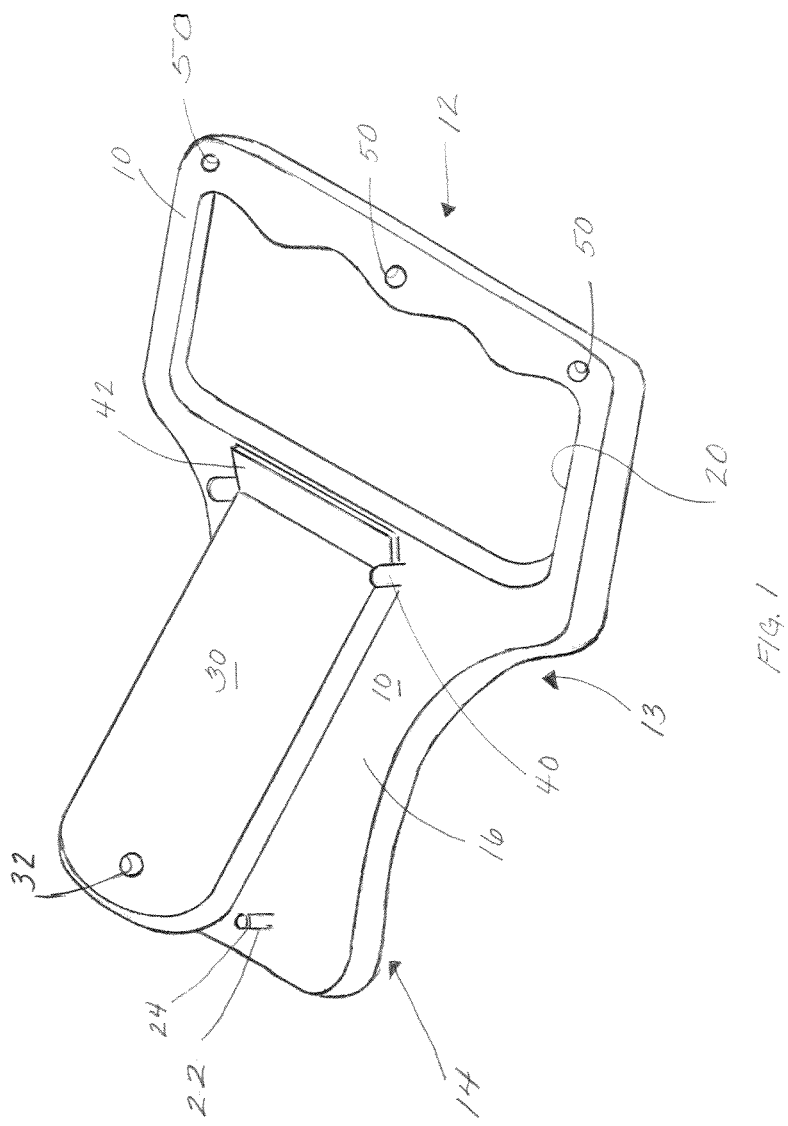
FIG. 1 a perspective view of the releasable handle device of the invention.

Referring now to the figures, the releasable handle device of the invention is composed of a substantially planer base member 10 extending longitudinally from a handle end 12 to a post end 14 with an intermediate region 13 between the two. The base member can be any shape but will commonly be rectangular, oblong, elliptical or paddle-shaped, as shown in FIG. 1. Being substantially planer, the base member has a top surface 16 and a bottom surface 18 (see FIG. 3) and further includes a first opening, or cut out, 20, in the handle end 12 extending from the top surface through the bottom surface that is formed to enable the hand of the user of the device to grasp and hold the device, as an integral handle. The opening, 20, can be of any size or shape as long as the hand of the user is able to extend through it to grasp the device. On top surface 16 at the opposite, post end 14, the base member has a rigid post, 22, fastened at its lower butt end to the top surface of the base member in perpendicular relation thereto. The post may be integrally formed as part of the base member or it may be a separate piece fastened to the base member by fastening means for example a screw or rivet. The shape of post 22 is not critical; it can be square, rectangular, triangular or cylindrical for example. The post has a boss, 24, at or near its upper end, which is formed to releasably hold the closure member of the device in place, as will be explained in detail below. The boss can be any type of protrusion on the surface of the post, as long as it will catch or clasp and retain the closure member in place while the device is in use and permit the user to release the closure member from the base member when the user so desires. A preferred boss is an annular ring integrally formed in the post near the end opposite the butt end. The base member has two functions: it acts as an integral handle for the device and it provides a base onto which a closure member may be engaged to secure the device in place on the tarpaulin.

The closure member, 30, of the device may be a substantially planer structure, significantly smaller in size than the base member but of the same basic shape. Conveniently perhaps, the closure member can be shaped for example as a base member bisected along its width to form a structure approximately one half the size of the base member. However, the actual shape of the closure member is not critical as long as it is small enough so that it does not cover any portion of the first opening, 20, forming the integral handle in base member 10, and is large enough to extend over the base member's post, 22. At a first end, closure member 30 is hingably mounted onto base member 10 transversely in a substantially central location in the intermediate region 13 between the integral handle and the base member post. Near a second, opposite end, closure member 30 has a hole, 32, formed and positioned for mating engagement with base member post 22, to allow insertion of the base member post through the hole to snap-close the closure member in superposed relation to the base member.

Figure 2:
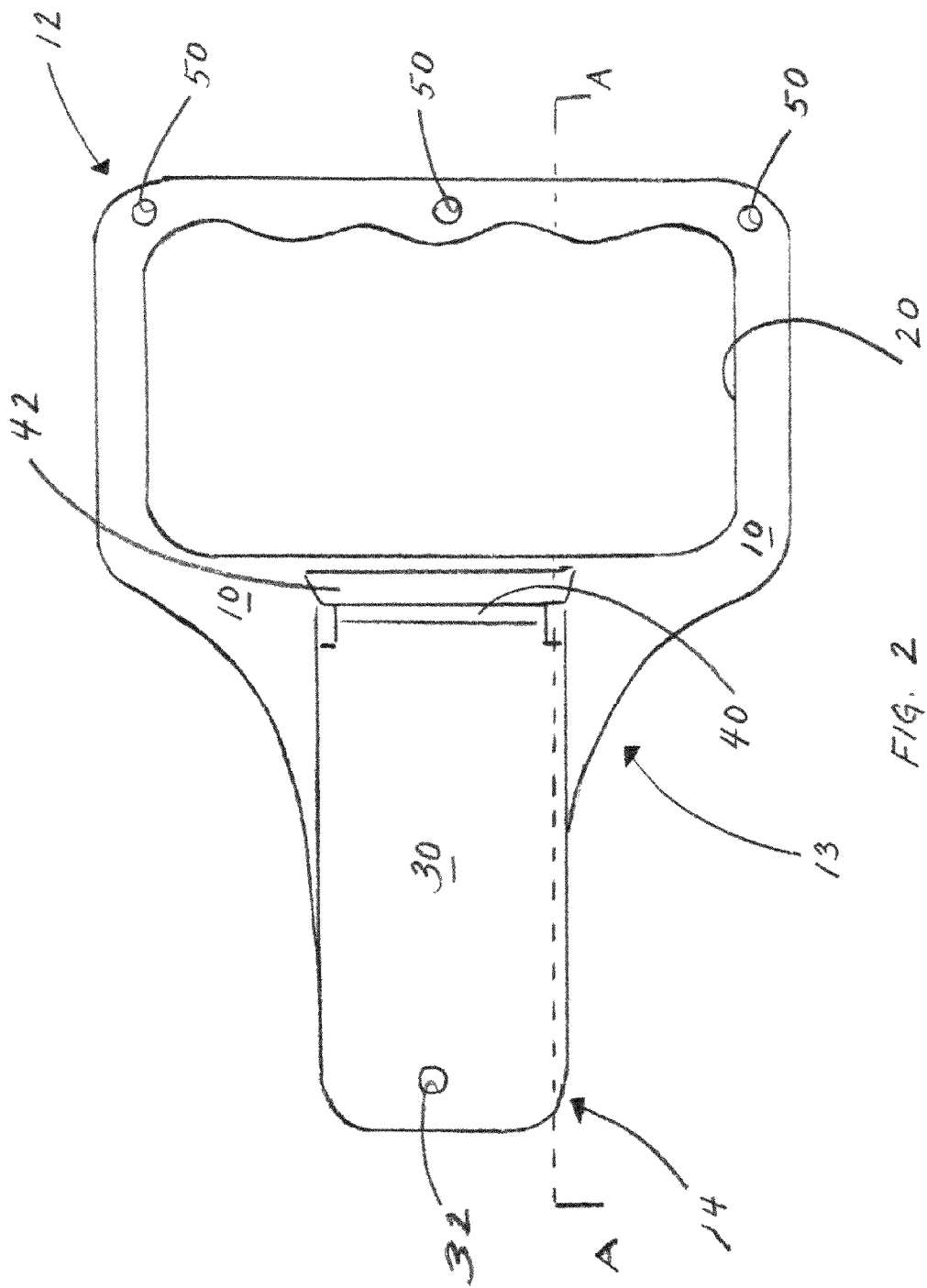
FIG. 2 is a top plan view of the device.
Figure 3:
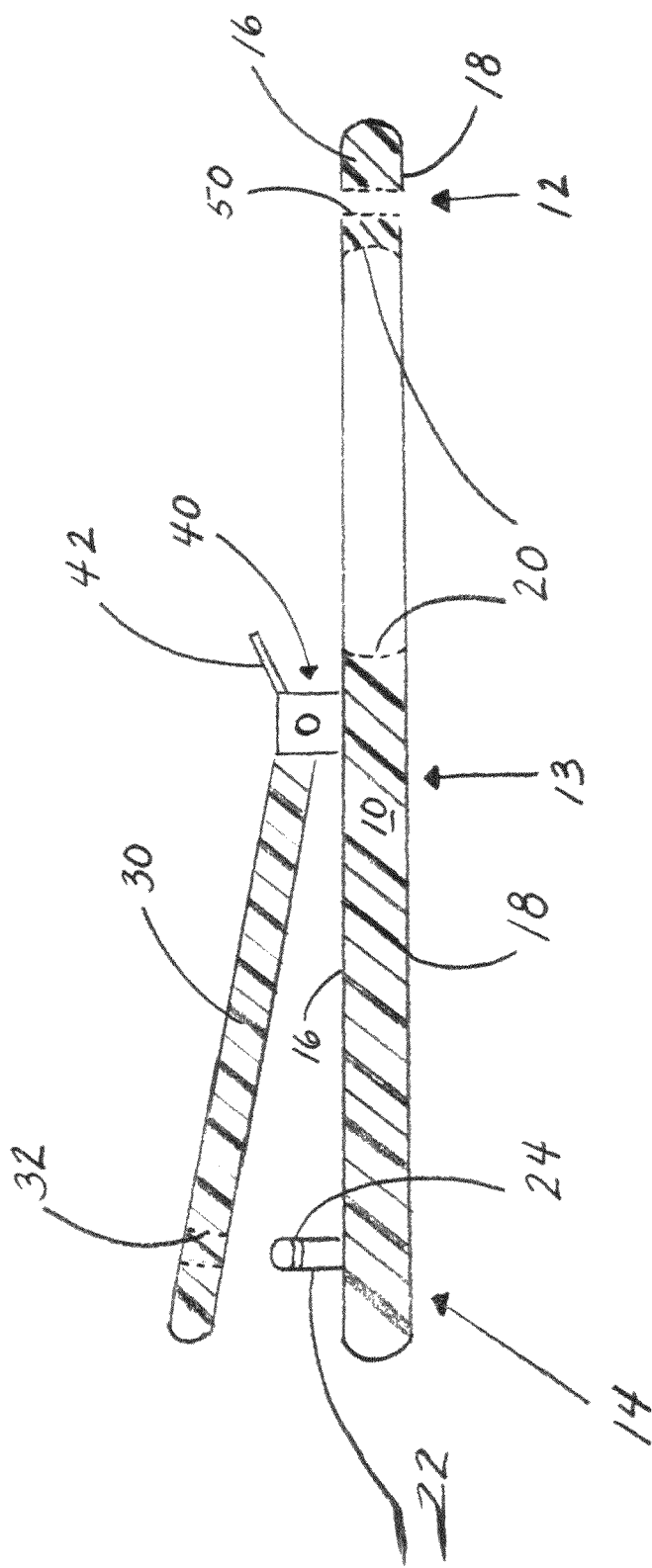
FIG. 3 is a cross-sectional side view of the device in a partially open position, taken along the line A-A in FIG. 2.
Figure 4:
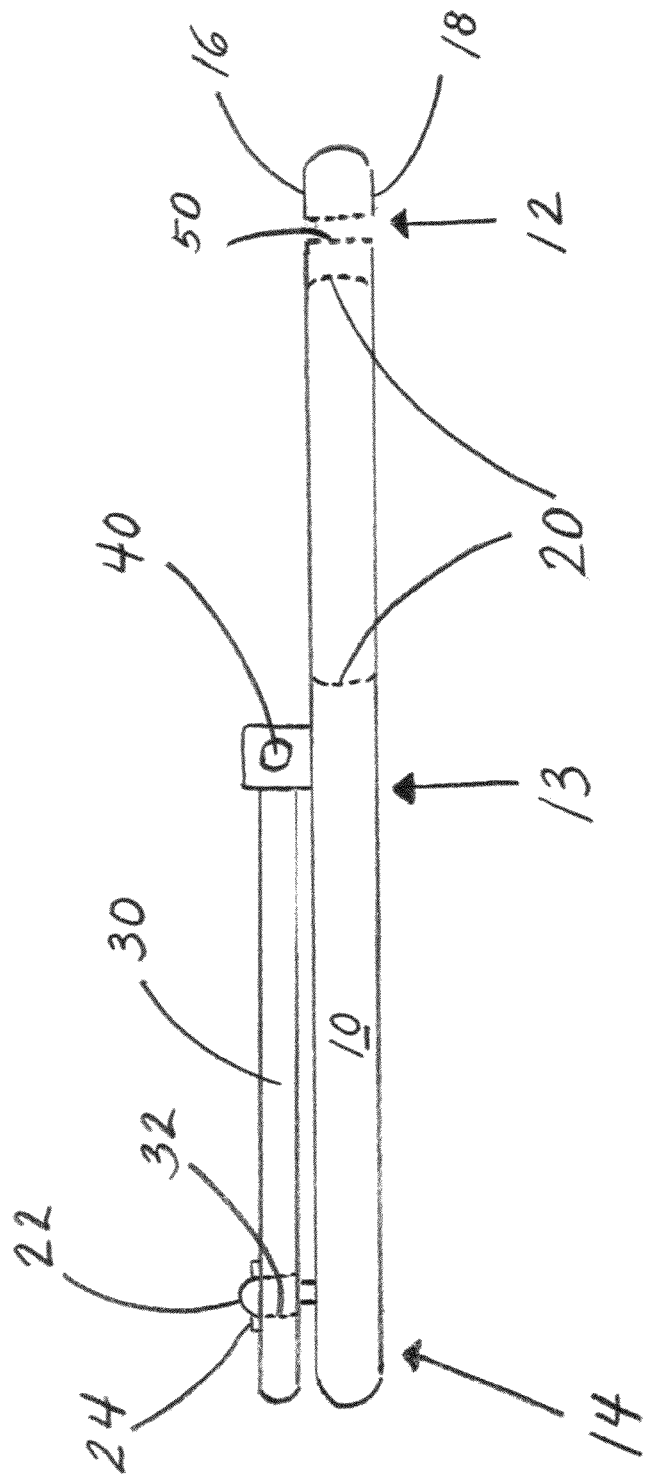
FIG. 4 shows the device of FIG. 3 with the closure member in the close-locked position.

The device also includes a hinge, 40, mounted between and connecting together base member 10 and closure member 30 at the first end of closure member 30 for moving the closure member between an open position as shown in FIGS. 1 and 3 and a closed position substantially superposed on the base member, as shown in FIG. 4. Preferred hinge types include spring-loaded, pin, butt and mouse trap hinges. A pin hinge is illustrated in FIGS. 1-7. Hinge 40 may be positioned at the edge or end of the closure member as shown in FIG. 4, or alternatively, the hinge may be formed and positioned inward from the edge, forming a lip, 42, as shown in FIGS. 1-3, that the user can press to release the closure member in its closed-locked position. Referring now to FIGS. 8-10, there is shown another embodiment of the device of the invention, which employs spring-loaded hinge 40 instead of a pin hinge. FIG. 9 is a side view of the hinge in the device of the invention and FIGS. 9 and 10 show the hinge in exploded side views, with FIG. 10 showing the hinge disassembled. This alternative, spring-loaded hinge is composed of metal wire 47 which is bent around the top of closure member 30 and the bottom of base member 10 is spring forming relation thereto. Closure member 30 is formed with interior flange 46 extending downward from the bottom surface of the closure member in perpendicular relation thereto and to top of base member 10 is formed with mating interior flange 48 extending upward and positioned in mating relation to interior flange 46. The tension caused by bent wire 44 holds the two flanges in mating relation. It is well within the level of skill in the art to form and mount other types of hinges between base member 10 and closure member 30.

Referring now to FIGS. 5-6, the device of the invention is illustrated in use with a tarpaulin, 60, having a grommet, 62. Grommet 62 is placed over post 22 and hinge mounted closure member 30 is snap-closed in place through closure member hole 32 over post 22 and held in place by boss 24.

Figure 7:
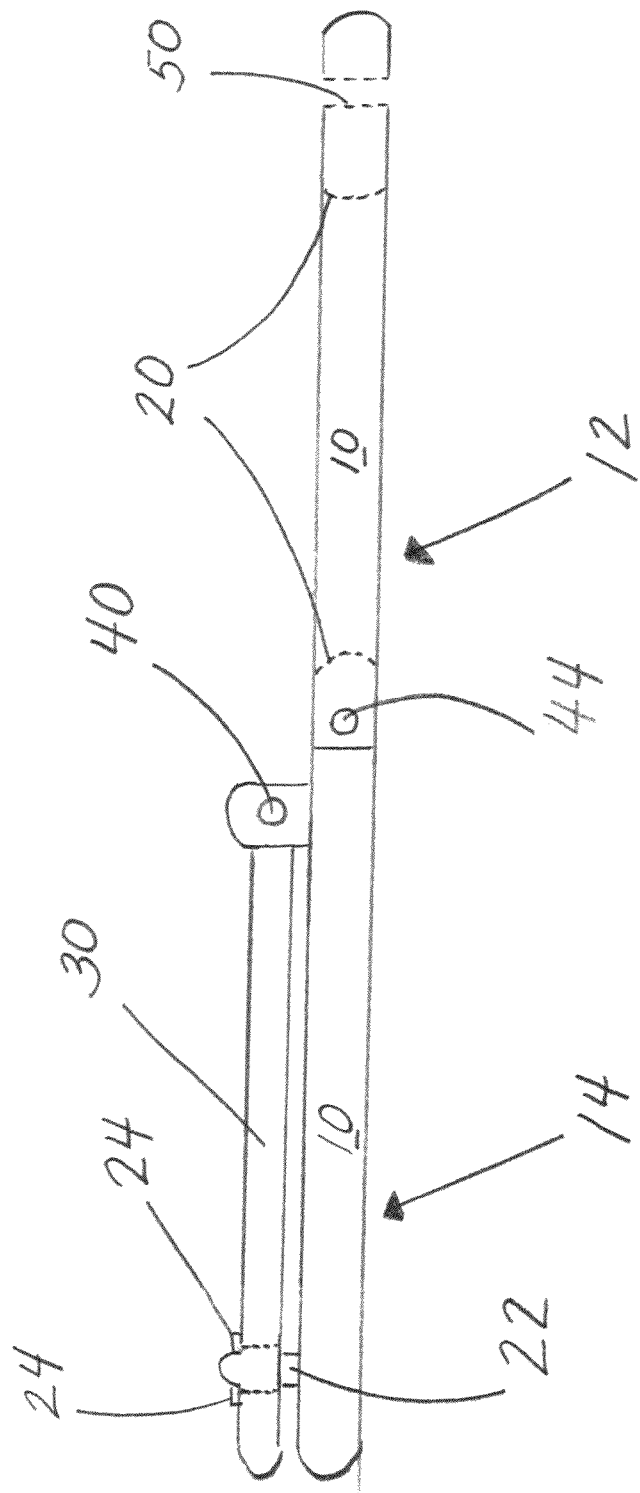
FIG. 7 illustrates the device with the optional hinged handle.

Optionally, the device as described above may include, in the base member, a second opening or openings, 50, in the handle region of the base member, formed and positioned to permit the removable attachment of another object or objects to the device, as is shown in FIG. 5. These openings can be holes or small bores extending from the top surface through the bottom surface of the base member. This size of the openings or holes must be large enough to permit attachment of, for example, a lanyard, bungee cord, clip, or string, but small enough so that the structural integrity and strength of the handle portion of the base member is maintained. In FIG. 6. The device of the invention is shown with a bungee cord, 70, positioned in hole 50. Referring now to FIG. 7, there is illustrated another embodiment of the device of the invention. In this embodiment, base member 10 may be formed with additional handle hinge 44 positioned so as to permit the handle end, 12, of the base member to pivot in relation to the post end, 14, of the base member. Additional optional features that can be included in the device are a magnet (not shown) mounted on the bottom surface of the base member for removably attaching the device to a metal surface.

The base member, post, and closure member may be composed of a wide variety of materials. Molded resilient materials are preferred; for example, injection molded plastic. Exemplary materials include polymers, thermoset polymers, aluminum and aluminum blends, wood, steel, stainless steel, copper and copper blends, and lead-coated copper and copper blends. Exemplary types of polymers include polystyrenes, polyvinyl chlorides, polyesters, polyethylene terephthalates, low-density polyethylenes, polypropylenes, apolyamides, acrylonitrile butadiene styrenes, polycarbonates, polycarbonate/acrylonitrile butadiene styrene blends, polyurethanes, melamine formaldehydes, plastics, and elastomeric plastics. Preferred materials include glass fiber reinforced molded nylon and polypropylene. The same material need not be used for all parts of the device.

A rubber coating may be applied to all or some of the parts of the releasable handle device of the invention to provide a scratch-resistant, non-slip covering.

Other embodiments of the invention may employ structures or components that vary in form from the embodiments described and illustrated herein and that various modifications may be introduced into the arrangement and construction of the parts of the device without departing from the spirit or scope of the invention, as defined in the appended claims.

I claim:

1. A device for securing and handling a tarpaulin comprising a substantially planer and rectangular, oblong, elliptical or paddle-shaped base member having (i) a first opening positioned at one end of the base member and formed to enable the hand of a user of the device to grasp and hold the device, (ii) a rigid post having one end fixed to the opposite end of the base member and extending in perpendicular relation to it, said post having a annular ring near the other end of the post, a closure member hingeably attached at one end to a portion of the base member between the first opening and the post and having a hole in the opposite end formed to allow insertion of the post through the hole to snap-close the closure member in superposed relation to the base member, a hinge mounted between the base member and the closure member for moving the closure member between an open position substantially perpendicular to the base member and a closed position substantially superposed on the base member; and a second opening at the end of the base member having the first opening, the second opening being a bore extending from a top surface through a bottom surface and positioned between the first opening and end of the base member.

2. The device according to claim 1 where the hinge is a spring-loaded hinge.

3. The device according to claim 1 where the hinge is a pin hinge.

4. The device according to claim 1 where the hinge is a butt hinge.

5. The device according to claim 1 where the hinge is a mouse trap hinge.

6. A device for securing and handling a tarpaulin comprising a substantially planer and rectangular, oblong, elliptical or paddle-shaped base member having (i) a first opening positioned at one end of the base member and formed to enable the hand of a user of the device to grasp and hold the device, (ii) a rigid post having one end fixed to the opposite end of the base member and extending in perpendicular relation to it, said post having a annular boss near the other end of the post;

a closure member hingeably attached at one end to a portion of the base member between the first opening and the post and having a hole in the opposite end formed to allow insertion of the post through the hole to snap-close the closure member in superposed relation to the base member, a hinge mounted between the base member and the closure member for moving the closure member between an open position substantially perpendicular to the base member and a closed position substantially superposed on the base member; and a second opening at the end of the base member having the first opening, the second opening being a bore extending from a top surface through a bottom surface and positioned between the first opening and end of the base member.

7. The device according to claim 6 where the hinge is a spring-loaded hinge.

8. The device according to claim 6 where the hinge is a pin hinge.

9. The device according to claim 6 where the hinge is a butt hinge.

10. The device according to claim 6 where the hinge is a mouse trap hinge.

* * * * *